(12) United States Patent
Yao et al.

(10) Patent No.: US 8,068,493 B2
(45) Date of Patent: Nov. 29, 2011

(54) METHOD AND APPARATUS OF JOINT-REGISTERING IN MULTICAST COMMUNICATION NETWORK

(75) Inventors: Chunyan Yao, Shanghai (CN); Songwei Ma, Shanghai (CN); Haibo Wen, Shanghai (CN)

(73) Assignee: Alcatel Lucent, Paris (FR)

( * ) Notice: Subject to any disclaimer, the term of this patent is extended or adjusted under 35 U.S.C. 154(b) by 211 days.

(21) Appl. No.: 12/448,548

(22) PCT Filed: Jul. 3, 2007

(86) PCT No.: PCT/CN2007/002061
§ 371 (c)(1),
(2), (4) Date: Jun. 25, 2009

(87) PCT Pub. No.: WO2008/077295
PCT Pub. Date: Jul. 3, 2008

(65) Prior Publication Data
US 2010/0111084 A1 May 6, 2010

(30) Foreign Application Priority Data
Dec. 26, 2006 (CN) .......................... 2006 1 0148109

(51) Int. Cl.
*H04L 12/56* (2006.01)
(52) U.S. Cl. ........................................ 370/390; 370/220
(58) Field of Classification Search ................. 370/220, 370/400, 389, 390; 709/230, 225
See application file for complete search history.

(56) References Cited

U.S. PATENT DOCUMENTS

| 6,438,109 B1 * | 8/2002 | Karaoguz et al. ............. 370/252 |
| 6,611,872 B1 * | 8/2003 | McCanne ...................... 709/238 |
| 6,732,182 B1 * | 5/2004 | Beverly, IV ................... 709/230 |
| 6,912,589 B1 | 6/2005 | Jain et al. |
| 7,339,903 B2 * | 3/2008 | O'Neill ......................... 370/313 |
| 7,421,578 B1 * | 9/2008 | Huang et al. .................. 713/163 |
| 7,616,632 B2 * | 11/2009 | Loa et al. ...................... 370/389 |
| 7,719,958 B1 * | 5/2010 | Azimi et al. ................... 370/220 |
| 2003/0193958 A1 * | 10/2003 | Narayanan ..................... 370/400 |

(Continued)

FOREIGN PATENT DOCUMENTS
CN 1503507 6/2004

OTHER PUBLICATIONS

D.Farinacci et al., "Anycast-RP Using Protocol Independent Multicast(PIM)," Cisco Systems, Aug. 2006.

(Continued)

*Primary Examiner* — Thong Vu
(74) *Attorney, Agent, or Firm* — Harness, Dickey, Pierce

(57) ABSTRACT

The present invention provides a method and apparatus for registering to a designated router in a rendezvous point in an anycast group in a multicast communication network, wherein the rendezvous point implements a joint-registering based on registering status of all rendezvous points in the anycast group. The main rendezvous point sends to the designated router the Register Stop message only when all rendezvous points in the anycast group do not need the Register message from the designated router; when any one of other rendezvous points does not need the Register message, sending the Register message to it is stopped. With the method and apparatus of the present invention, the cases resulting in the interruption of subscriber terminal multicast traffic can be reduced, and the CPU resource of the main rendezvous point and bandwidth resources between it and other rendezvous points are saved.

20 Claims, 4 Drawing Sheets

U.S. PATENT DOCUMENTS

| | | | |
|---|---|---|---|
| 2006/0262792 A1* | 11/2006 | Rokui | 370/390 |
| 2006/0268934 A1 | 11/2006 | Shimizu et al. | |
| 2007/0165632 A1* | 7/2007 | Zwiebel | 370/390 |
| 2008/0291867 A1* | 11/2008 | Weniger et al. | 370/328 |
| 2009/0238188 A1* | 9/2009 | Xu et al. | 370/392 |

OTHER PUBLICATIONS

PIM-SM, "Modeling and Improvement of PIM-SM Protocol," *Journal of Software*, vol. 17, No. 2, Feb. 2006, pp. 285-294.

European Search Report dated Mar. 8, 2011 in corresponding European Patent Application No. 07721621.6.

Yao, Chunyan and Haibo Wen. PIM WG, "Cooperation register mechanism in Anycaster RP; draft-yao-pim-cooperation-register-00.txt." IETF Standard-Working-Draft, Internet Engineering Task Force, IETF, CH, Mar. 1, 2007, XP015050601.

Estrin, Deborah. USC/ISI. Farinacci, Dino. Cisco Systems. "Bi-Directional Shared Trees in PIM-SM; draft-farinacci-bidir-pim-01.txt." IETF Standard-Working-Draft, Internet Engineering Task Force, IETF, CH, No. 1, May 17, 1999, XP015013082.

Kim et al. "Anycast Rendevous Point (RP) mechanism using Protocol Independent Mutlicast (PIM) and Multicast Source Discovery Protocol (MSDP); rfc3446.txt." IETF Standard, Internet Engineering Task Force, IETF, CH, Jan. 1, 2003, XP015009229.

* cited by examiner

METHOD AND APPARATUS OF JOINT-REGISTERING IN MULTICAST COMMUNICATION NETWORK

FIELD OF THE INVENTION

The present invention relates to a multicast communication network, and more particularly, to a rendezvous point in an anycast group in the multicast communication network.

BACKGROUND OF THE INVENTION

In an access and edge network, PIM-SM protocol (RFC4601, Protocol Independent Multicast-Sparse Mode: Protocol Specification (Revised)) is supported in edge nodes and core network nodes. A Rendezvous Point (RP) is the root of PIM-SM share tree. The anycast RP protocol using the PIM protocol (RFC4610, Anycast-RP Using Protocol Independent Multicast) is designed to provide load balancing and failover for the RP. However, there is no cooperation mechanism among anycast RPs in the protocol when sending Register-Stop Messages, which may result in subscriber terminals under some anycast RPs having interrupted multicast service and bandwidth waste among anycast RPs due to trashy Register Messages.

According to RFC4610, the RPs in an anycast group work as follows.

As shown in FIG. 1, RP1, RP2 and RP3 represent three RPs in an anycast group; each of R1, R1', R2 and R3 is a subscriber terminal in the group; DR stands for a Designated Router (DR) directly attached to a source S1 which sends information to the anycast group. It is assumed that RP1, RP2 and RP3 are all assigned with the same IP address which is used as the anycast RP address and called an IPA.

When S1 starts sending source data traffic, the flow to be obeyed is as follows.

1. S1 sends a multicast packet, and the DR directly attached to the S1 forms a PIM Register message to send to the anycast RP address (IPA) through adding a unicast header to the multicast packet. The unicast routing system delivers the PIM Register message to the nearest RP, in this case RP1.

2. The RP1 uses its own IP address as the source address, and sends the Register message from the DR to the RP2 and RP3, respectively.

3. The RP1 sends a Register Stop message to the DR.

4. When receiving the Register message from the RP1, the RP2 and the RP3 send the Register Stop message to the RP1 respectively.

5. The RP1 receives the Register Stop messages from the RP2 and the RP3, without any processing.

The problems in the above procedure comprise: firstly, the RP1 sends the Register Stop message to the DR without considering that the RP2 and RP3 may still need the Register message from the DR, since the shortest multicast delivery paths (that is, the Shortest Path Tree) from the DR to the RP2 and the RP3 may haven't been established, which makes the subscriber terminals' multicast service desultory. Secondly, the RP1 sends Register messages to RP2 and RP3 without considering that RP2 and RP3 may not need them anymore recently, because the shortest multicast delivery paths from the DR to the RP2 and the RP3 may have been established or there is no subscriber terminal under RP2 or RP3, which may results in waste of RP1's CPU resource and bandwidth among anycast RPs.

SUMMARY OF THE INVENTION

The present invention is provided to solve the problems of desultory multicast service and waste of bandwidth in anycast groups of the multicast communication network.

For the sake of convenient, a RP receiving the Register message from the DR first is called as a main RP. Each RP in the anycast group may become the main RP due to the dynamic change of network topology structure. Thus, instead of being limited to the main RP, the technical solution of the present invention is applicable to any RPs in the anycast group.

According to one aspect of the present invention, there is provided a method for registering to a designated router in a rendezvous point in an anycast group in a multicast communication network, wherein the rendezvous point implements a joint-registering based on registering status of all rendezvous points in the anycast group.

According to another aspect of the present invention, there is proposed a method for registering to a designated router in a rendezvous point in an anycast group in a multicast communication network, comprising the steps of: receiving a Register message from the designated router; detecting whether Register message is still needed by the rendezvous point and all other rendezvous points in the anycast group; and when none of the rendezvous point and all other rendezvous points needs the Register message, sending a Register Stop message to the designated router.

According to still another aspect of the present invention, there is proposed a registering apparatus for registering to a designated router in a rendezvous point in an anycast group in a multicast communication network, wherein the registering apparatus implements a joint-registering based on registering status of all rendezvous points in the anycast group.

According to yet another aspect of the present invention, there is proposed a registering apparatus for registering to a designated router in a rendezvous point in an anycast group in a multicast communication network, comprising a receiving means for receiving a Register message from the designated router, a first detecting means for detecting whether Register message is still needed by the rendezvous point and all other rendezvous points in the anycast group, and a sending means for sending a Register Stop message to the designated router when none of the rendezvous point and all other rendezvous points needs the Register message.

Before sending the Register Stop message to the DR and sending the Register message to any one of other anycast RPs, the main RP determines whether it has received the Register Stop message from any one of other anycast RPs recently. The main RP may send to the DR the Register Stop message only after all other anycast RPs have sent the Register Stop messages to the main RP recently. By doing so, the probability of interrupting the multicast traffic to the subscriber terminal is greatly reduced. The main RP only sends the Register message to the anycast RP when it has not received the Register Stop message from the anycast RP recently. Thus, the main RP saves its CPU resource and bandwidth resource between it and other RPs since it is unnecessary to unpack the Register message from the DR and repack it.

BRIEF DESCRIPTION ON THE DRAWINGS

DESCRIPTION OF THE PREFERRED EMBODIMENTS

Figure 1:
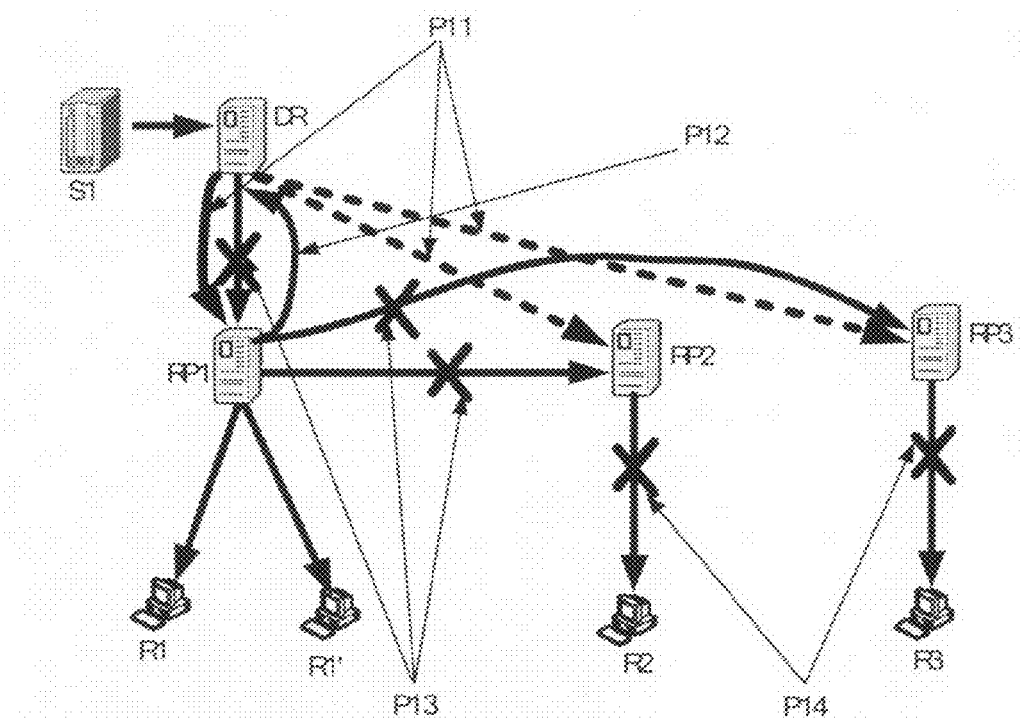
FIG. 1 is a diagram showing a scene where the multicast traffic may be interrupted when an anycast group of RPs is used in a multicast communication network.

FIG. 1 is a diagram showing a scene where the multicast traffic may be interrupted when an anycast group of RPs is used in a multicast communication network. In the network topology structure as shown in FIG. 1, there are included a multicast source S1, a designated router DR, three anycast RPs RP1, RP2 and RP3 and subscriber terminals R1, R1', R2 and R3. It is assumed that the RP1 is the main RP, and the dashed lines in the figure represent that the Shortest Path Trees from the DR to the RPs have not been established.

As shown in FIG. 1, during procedure P11, the Shortest Path Tree from the DR to the RP1 has been established but the Shortest Path Trees from the DR to the RP2 and RP3 have not been established. According to the PIM-SM protocol, upon receiving a Register message, the RP1 may send a Register Stop message to the DR. According to RFC4610, the RP1 sends the Register Stop message to the DR without considering associating it with Register Stop messages from the RP2 and RP3. During procedure P12, the RP1 sends the Register Stop message to the DR before receiving the Register Stop messages from the RP2 and the RP3. During procedure P13, upon receiving the Register Stop message, the DR does not send the Register message to the RP1 for a moment (that is, during the running period of the Register-Stop Timer in the DR, please see PIM-SM protocol for details). Thus, during procedure P14, the RP2 and RP3 may not receive the Register messages from the RP1, and thus the multicast traffic to the R2 and R3 respectively may be interrupted.

Figure 2:
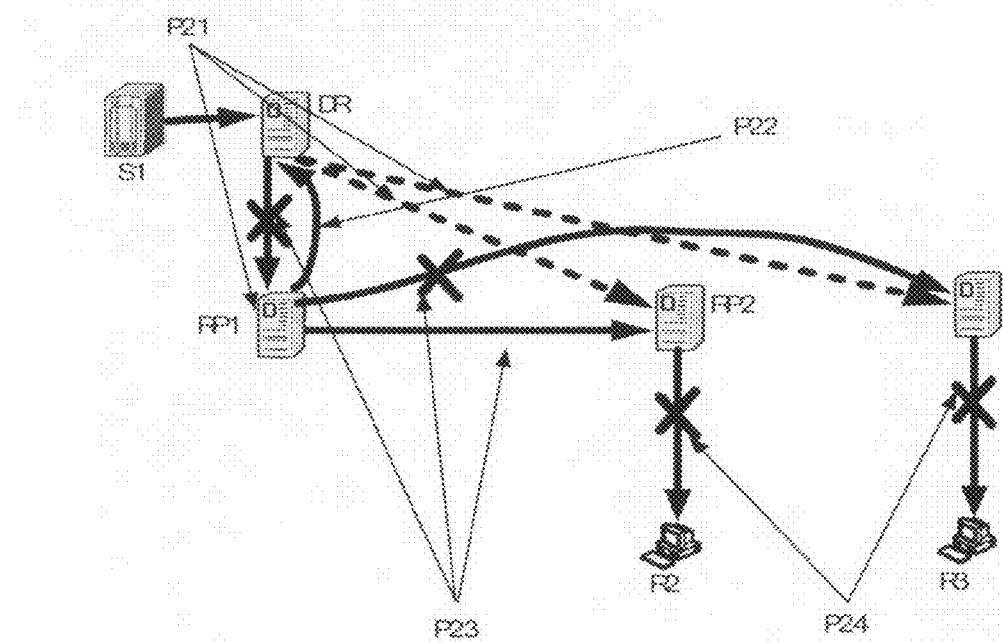
FIG. 2 is a diagram showing another scene where the multicast traffic may be interrupted when an anycast group of RPs is used in a multicast communication network.

Another serious traffic interruption is as shown in FIG. 2. In the case, there is no subscriber terminal under the RP1. During procedure P21, the Shortest Path Trees from the DR to the RP2 and RP3 haven't been established. According to the PIM-SM protocol registration mechanism and RFC4610, during the procedure P22, the RP1 sends the Register Stop message to the DR after receiving the Register message from the DR since there is no subscriber terminal under it. However at the moment, the RP1 has not received the Register Stop messages from the RP2 and RP3. During procedure P23, upon receiving the Register Stop message from the RP1, the DR does not send the Register message to the RP1 for a moment (that is, during the running period of the Register-Stop Timer in the DR, please see PIM-SM protocol for details). During procedure P24, the RP2 and RP3 can not obtain the corresponding Register message during the period, thus interrupting the multicast traffic to the subscriber terminals R2 and R3.

Figure 3:
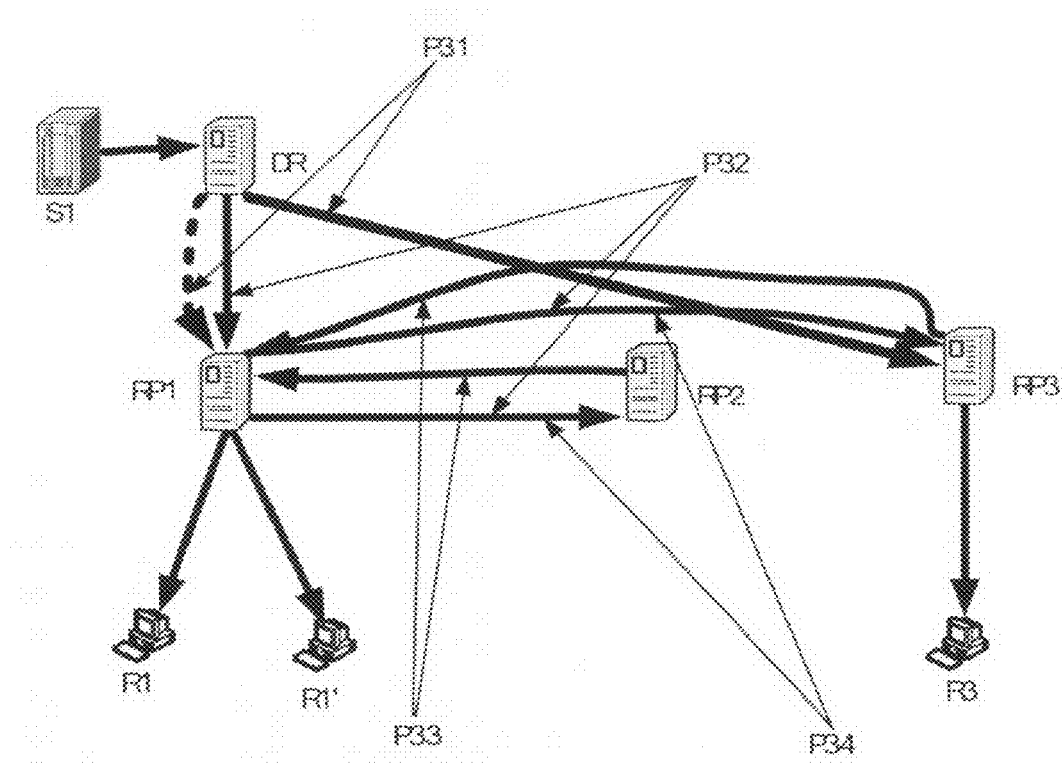
FIG. 3 is a diagram showing yet another scene where the multicast traffic may be interrupted when an anycast group of RPs is used in a multicast communication network.

FIG. 3 depicts how the bandwidth among RPs in an anycast group is wasted. In this scenario, during procedure P31, there is no subscriber terminal under the RP2, the Shortest Path Tree from the DR to the RP3 has been established, but the Shortest Path Tree from the DR to the RP1 has not been established completely. Thus, when receiving the Register message from the DR, during the procedure P32, the RP1, according to RFC4610, copies the Register message from the DR to the RP2 and the RP3, respectively. According to the PIM-SM protocol, during procedure P33, the RP2 and RP3 would send Register Stop messages to the RP1, since there is no subscriber terminal under the RP2 and the RP3 has received the native multicast data packet via the Shortest Path Tree from the DR. According to RFC4610, there is no operation taken by the RP1 when processing the Register Stop message, and thus the RP1 continues sending the Register messages to the RP2 and RP3 without considering that the RP2 and RP3 do not need the Register messages any more recently. Hence, the RP1 wastes its CPU resource and bandwidth due to sending trashy Register messages to the RP2 and RP3.

Obviously, it is necessary to add a cooperation mechanism to the main RP. To solve the problems of interrupting multicast traffic and waste of CPU resource and bandwidth resulted from lack of the cooperation mechanism among RPs in the anycast group, the present invention proposes a method and apparatus of joint-registering to a DR by a main RP, being characterized in that a RP may send a Register Stop message to the DR only when both the RP and other RPs in the anycast group do not need the Register message from the DR, thereby implementing a joint-registering procedure.

Figure 4:
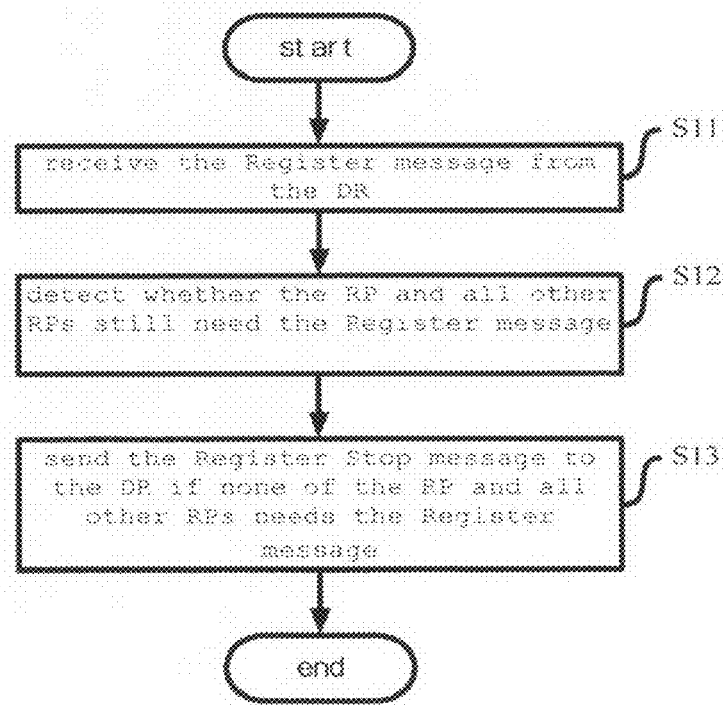
FIG. 4 is a flow chart showing a joint-registering solution in a RP in an anycast group in a multicast communication network according to an embodiment of the present invention.

FIG. 4 depicts a flow chart showing a joint-registering in a main RP in an anycast group in a multicast communication network according to an embodiment of the present invention.

At first, at step S11, the main RP receives a Register message from the DR. The Register message may experience multiple hops before arriving at the main RP.

Then, at step S12, the main RP detects whether Register message is still needed by itself and all other RPs in the anycast group.

At last, at step S13, when the RP and all other RPs do not need the Register message any more, the main RP sends to the DR a Register Stop message to tell the DR not to send the Register message to it.

In the main RP, there are many approaches to detect whether the Register message is still needed by the RP and other RPs.

Figure 5:
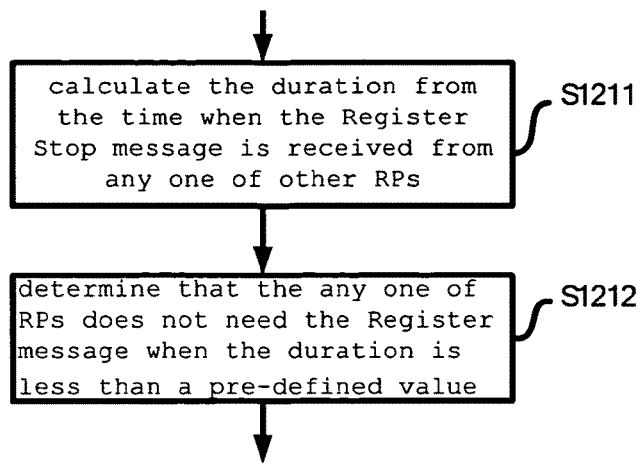
FIG. 5 is a flowchart of determining whether Register message is still needed by any one of other RPs performed in a RP in an anycast group in a multicast communication network according to an embodiment of the present invention.

FIG. 5 depicts steps, performed by the main RP in the anycast group in the multicast communication network, of determining whether Register message is still needed by any other RPs according to an embodiment of the present invention.

At first, at step S1211, the duration from the time when the last Registration Stop message is received from any one of other RPs is calculated.

Then, at step S1212, when the duration is less than a predefined value, it can be determined that the any one of other RPs does not need the Register message any more.

The above predefined value is PT, and a referenced value range of the PT is given below.

It is assumed that the transmission delays of Register Stop messages from other RPs (RP1, RP2, RPn) in the same anycast group to the main RP are respectively T1, T2, ..., Tn, and T is defined by $$T = \max_{i \ne j, i, j \in \{1, \ldots n\}} (T_i - T_j),$$

then the minimum value of PT should not be less than T. It is assumed that the transmission delay from the DR to the main RP is $T_0$, the transmission delay from the main RP to the DR is $T_0'$. According to the PIM-SM protocol, if the value of the Register-Stop Timer in the DR is $T_v$ (the Register-Stop Timer is one implementing manner of the register inhibition time duration, and the above register inhibition time duration is the default value of the Register-Stop Timer, wherein the value range of $T_v$ can be found in the PIM-SM protocol), then the maximum value of PT should not be greater than $(T_v + T_0 + T_0')$.

When it is detected that any one of other RPs does not need the Register message any more, that is, the any one of other RPs has established the Shortest Path Tree from the DR to it (see the PIM-SM protocol) or there is no subscriber terminal under the RP desiring to receive the multicast packet in the Register message, a control is taken to stop forwarding the Register message to corresponding RP, which on one hand reduces the burden of the main RP's CPU since the main RP does not need to unpack the Register message from the DR and then forward it to corresponding RP which does not need the Register message any more after repacking the Register message, and on the other hand saves the bandwidth between the main RP and corresponding RP which does not need the Register message any more.

The RP detecting whether the Register message is still needed by itself has two cases: without a subscriber terminal desiring to receive the multicast traffic relating to the Register message via the RP or with it. In the first case, it is checked, based on the multicast address in the multicast packet in the Register message, whether there is a subscriber terminal receiving the multicast traffic corresponding to the multicast address. Generally, a multicast forwarding table is pre-established, the table comprises the corresponding relationship between the multicast address and a list of output interfaces on the RP to the subscriber terminal receiving the multicast traffic corresponding to the multicast address. Based on this table, a query can be carried out to determine whether there is any subscriber terminal desiring to receive the multicast traffic corresponding to the multicast address via the RP. In the latter case, when the Shortest Path Tree from the DR to the main RP has been established (the determining basis has been described in the PIM-SM protocol in detail), it can be deemed that the Register message is not needed any longer. The above two cases can have their respective flags or share one flag, which denoting that there is no need for the Register message.

Figure 6:
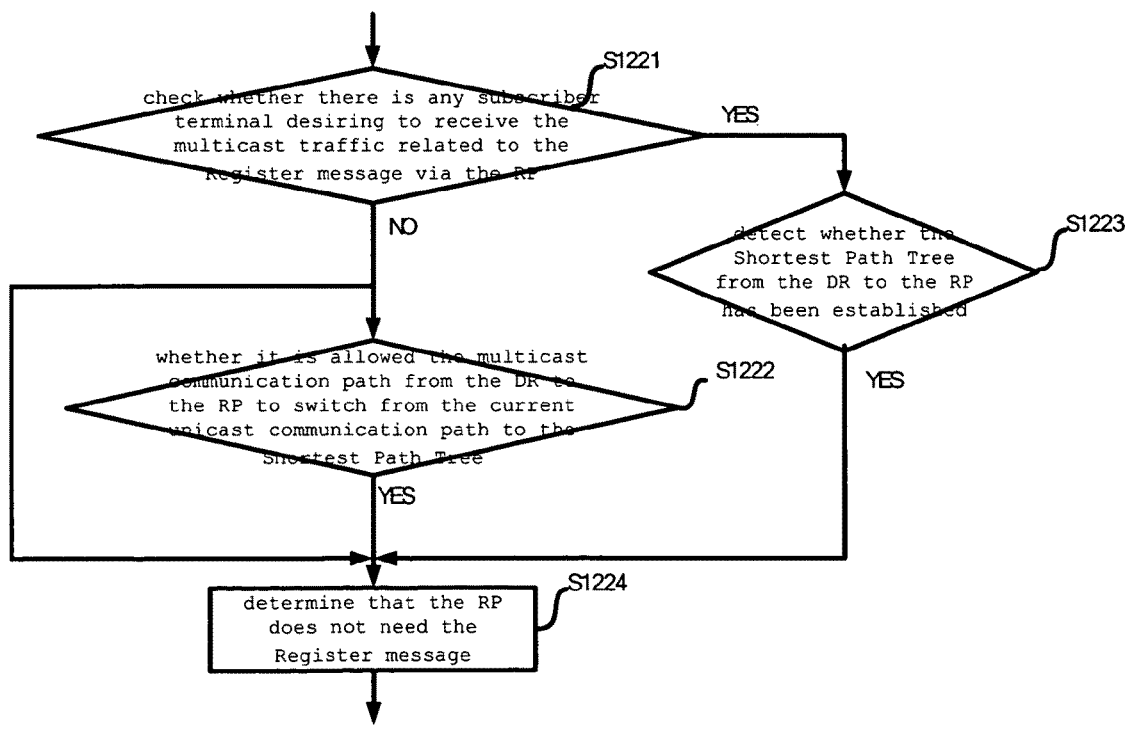
FIG. 6 is a flow chart, performed by a RP in the anycast group in a multicast communication network, for determining whether the Register message is still needed by itself according to an embodiment of the present invention.

FIG. 6 depicts steps, performed by a main RP in a anycast group in a multicast communication network, for determining whether the Register message is still needed by itself according to an embodiment of the present invention.

When the Register message from the DR is received, at first, it is checked whether there is any subscriber terminal desiring to receive the multicast traffic related to the Register message via the RP at step S1221.

If there is a subscriber terminal desiring to receive the multicast traffic related to the Register message, it is detected whether the Shortest Path Tree from the DR to the RP has been established at step S1223.

If the Shortest Path Tree has been established or it has been determined that there is no subscriber terminal desiring to receive the multicast traffic related to the Register message at step S1221, it is determined that the RP does not need the Register message from the DR anymore at step S1224.

To keep consistent with the PIM-SM protocol, the RP further sets a policy function SwitchToSptDesired according to the PIM-SM protocol. When its returned value is true, it means that the communication path from the DR to the RP is allowed to switch from unicast communication path receiving Register message currently to the Shortest Path Tree to implement multicast traffic communication; and when its returned value is false, it means that it is not allowed to switch from the unicast communication path receiving the Register message currently to the multicast Shortest Path Tree from the DR to the RP to implement the multicast traffic communication. The returned value can be set statically, or can be set during the running of the RP (see the PIM-SM protocol for details). Herein, to keep consistent with the PIM-SM protocol, at step S1222, when there is no subscriber terminal desiring to receive the multicast traffic related to the Register message via the RP and the returned value of SwitchToSptDesired is true, it can be determined that the RP does not need the Register message from the DR any more; and when there is no subscriber terminal desiring to receive the multicast traffic related to the Register message via the RP and the returned value of SwitchToSptDesired is false, it can be determined that the RP still needs the Register message from the DR.

The above procedure of determining by the main RP whether the Register message is stilled needed by itself is also applicable for other RPs. In fact, other RPs send the Register stop messages to the main RP after they determine that they do not need the Register messages based on the above procedure. In any one of other RPs, when the returned value of the policy function SwitchToSptDesired is true, it means that it is allowed to switch from the unicast communication path receiving the Register message from the DR via the main RP currently to the Shortest Path Tree from the DR to the RP to implement the multicast traffic communication; and when the returned value is false, it means that it is not allowed to switch from the unicast communication path receiving the Register message from the DR via the main RP currently to the multicast Shortest Path Tree from the DR to the RP to implement the multicast traffic communication. The procedure of setting its value is identical to that in the main RP, and thus the detailed description is omitted here.

Figure 7:
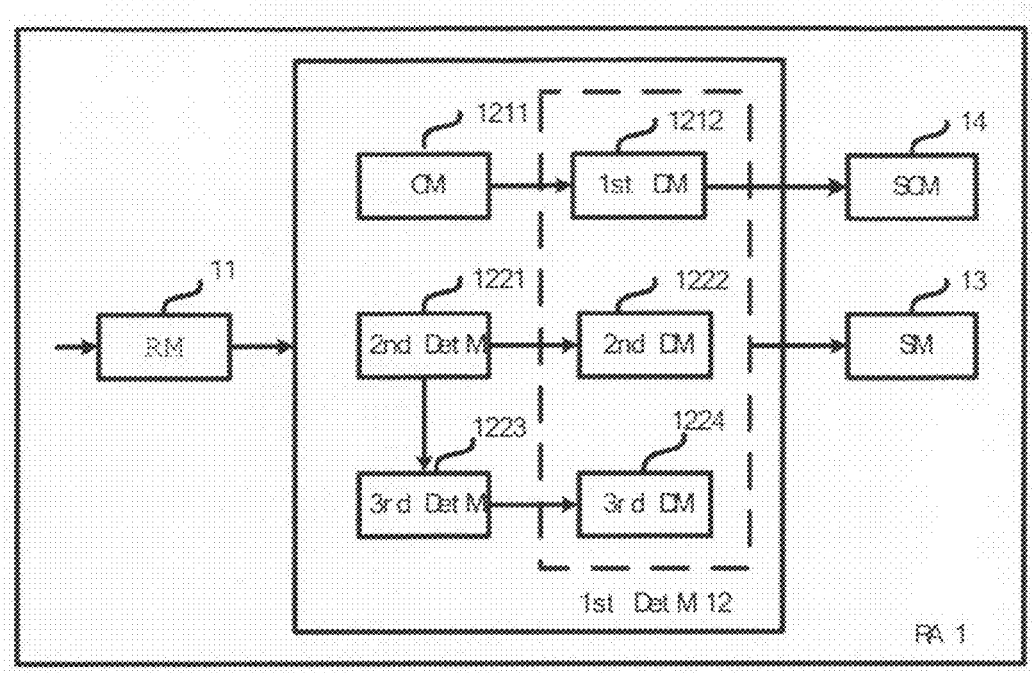
FIG. 7 is a structural diagram showing a joint-registering apparatus in a RP in an anycast group in a multicast communication network according to an embodiment of the present invention.

FIG. 7 shows an illustrative diagram showing a register apparatus in the main RP in an anycast group in a multicast communication network according to an embodiment of the present invention, where only when both the RP and other RPs in the anycast group do not need the Register message from the DR, the Register Stop message is sent to the DR, thereby accomplishing a joint-registering procedure. The register apparatus 1 comprises a receiving means 11, a first detecting means 12, a sending means 13 and a sending control means 14. The first detecting means 12 further comprises a calculating means 1211, a first determining means 1212, a second detecting means 1221, a second determining means 1222, a third detecting means 1223 and a third determining means 1224.

At first, the receiving means 11 receives from the DR the Register message of which the header is a unicast data packet and which comprises a multicast data packet from the source S1.

And then, the first detecting means 12 detects whether the Register message from the DR is still needed by the RP and all other RPs.

At last, when the first detecting means 12 detects that none of the RPs in the anycast group needs the Register message from the DR, the sending means 13 sends the Register Stop message to the DR to instruct the DR not to send the Register message to the main RP anymore.

When there is no subscriber terminal desiring to receive the multicast data packet under the RP (to keep compatible with the PIM-SM protocol, the returned value of the policy function SwitchToSptDesired corresponding to the multicast traffic is true), or the Shortest Path Tree from the DR to the RP has been established, the RP does not need the Register message from the DR any more, and now the RP can set a flag bit so as to send the Register Stop message to the main RP when receiving the Register message from the main RP.

In the multicast communication network using the anycast group, RPs may be far away from each other physically, which results in that the main RP may have forwarded multiple Register messages when one of other RPs has sent the Register Stop message, and therefore the main RP may receive multiple Register Stop messages from a plurality of other RPs.

The calculating means 1211 in the first detecting means 12 calculates the duration from the time when the last Register Stop message from any one of other RPs is received. When the duration is less than a predefined value, the first determining means 1212 determines that the RP does not need the Register message any more. Then, the sending control means 14 controls the RP not to send the Register message to corresponding RP. A timer can be used herein to calculate the duration from the time when the last Register Stop message is received from any RP of all other RPs.

The predefined value for the duration is PT, and a referenced value range of the PT is given below.

It is assumed that the transmission delays of Register Stop messages from other RPs (RP1, RP2, . . . RPn) in the same anycast group to the main RP are respectively T1, T2, . . . , Tn, and T is defined by $$T = \max_{i \neq j, i, j \in \{1, \ldots n\}} (T_i - T_j),$$

then the minimum value of PT should not be less than T. It is assumed that the transmission delay from the DR to the main RP is $T_0$, the transmission delay from the main RP to the DR is $T_0$. According to the PIM-SM protocol, if the value of the Register-Stop Timer in the DR is $T_v$ (the Register-Stop Timer is one implementing manner of the register inhibition time duration, and the above register inhibition time duration is the default value of the Register-Stop Timer, wherein the value range of $T_v$ can be found in the PIM-SM protocol), then the maximum value of PT should not be greater than ($T_v+T_0+T_0'$).

The RP detecting whether the Register message is still needed by itself has two cases, without a subscriber terminal desiring to receive the multicast traffic relating to the Register message via the RP or with it. It is checked, based on the multicast address in the multicast packet in the Register message, whether there is a subscriber terminal receiving the multicast traffic corresponding to the multicast address. Generally a multicast forwarding table is pre-established. The table comprises the corresponding relationship between the multicast address and the list of output interfaces on the RP to the subscriber terminal receiving the multicast traffic corresponding to the multicast address. Based on this table, a query can be carried out to determine whether there is any subscriber terminal receiving the multicast traffic corresponding to the multicast address via the RP. In the latter case, when the Shortest Path Tree from the DR to the main RP has been established (the determining basis has been described in the PIM-SM protocol in detail), it can be determined that the Register message is not needed any longer.

The specific procedures are as follows.

At first, the second detecting means 1221 checks whether there is any subscriber terminal desiring to receive the multicast traffic related to the Register message via the RP. Herein, there is generally a list of output interfaces on the RP to the subscriber terminal desiring to receive a multicast traffic corresponding to each multicast traffic in each RP. If the list is empty, then it means that there is no subscriber terminal desiring to receive the multicast traffic via the RP, and then, to keep consistent with the PIM-SM protocol, it can be further determined whether the returned value of the policy function SwitchToSptDesired corresponding to the multicast traffic is true. In the case that the list is empty and the returned value of the policy function is true, then one flag bit can be set to denote the scenario, and the second determining means 1222 determines that the Register message related to the multicast traffic is not needed by the RP any more. And if it is further determined that the returned value of the SwitchToSpt-Desired is false, then the second determining means 1222 further determines that the Register message from the DR is still needed by the RP.

When the list is not empty, it means that there is one or more subscriber terminals desiring to receive the multicast traffic related to the Register message via the RP, and the third detecting means 1223 then detects whether the Shortest Path Tree related to the above multicast traffic from the DR to the RP has been established. And if established, the third determining means 1224 determines that the RP does not need the Register message any more. According to the PIM-SM protocol, a flag bit can be set in the main RP about whether the Shortest Path Tree has been established.

It should be noted that the second determining means 1222 can ignore the above policy function SwitchToSptDesired, and when there is no subscriber terminal desiring to receive the multicast traffic related to the Register message via the RP, it can be determined that the RP does not need the Register message related to the multicast traffic anymore directly.

The above procedure of determining, by the main RP, whether the Register message is stilled needed by itself is also applicable for other RPs. In practice, other RPs send the Register stop messages to the main RP after they determine that they do not need the Register messages any longer based on the above procedure. What is a little different is that the meaning of the policy function SwitchToSptDesired in the main RP and other RPs is different. When its returned value is true, in the main RP it means that it is allowed to switch from the unicast communication path receiving the Register message from the DR to the RP currently to the multicast Shortest Path Tree from the DR to the RP to implement the multicast traffic communication; in other RPs it means that it is allowed to switch from the unicast communication path receiving the Register message from the DR via the main RP currently to the multicast Shortest Path Tree from the DR to the RP to implement the multicast traffic communication. When its returned value is false, in the main RP it means that it is not allowed to switch from the unicast communication path receiving the Registration message from the DR to the RP currently to the multicast Shortest Path Tree from the DR to the RP to implement the multicast traffic communication; and in other RPs it means that it is not allowed to switch from the unicast communication path receiving the Register message from the DR via the RP currently to the multicast Shortest Path Tree from the DR to the RP to implement the multicast traffic communication.

Figure 8:
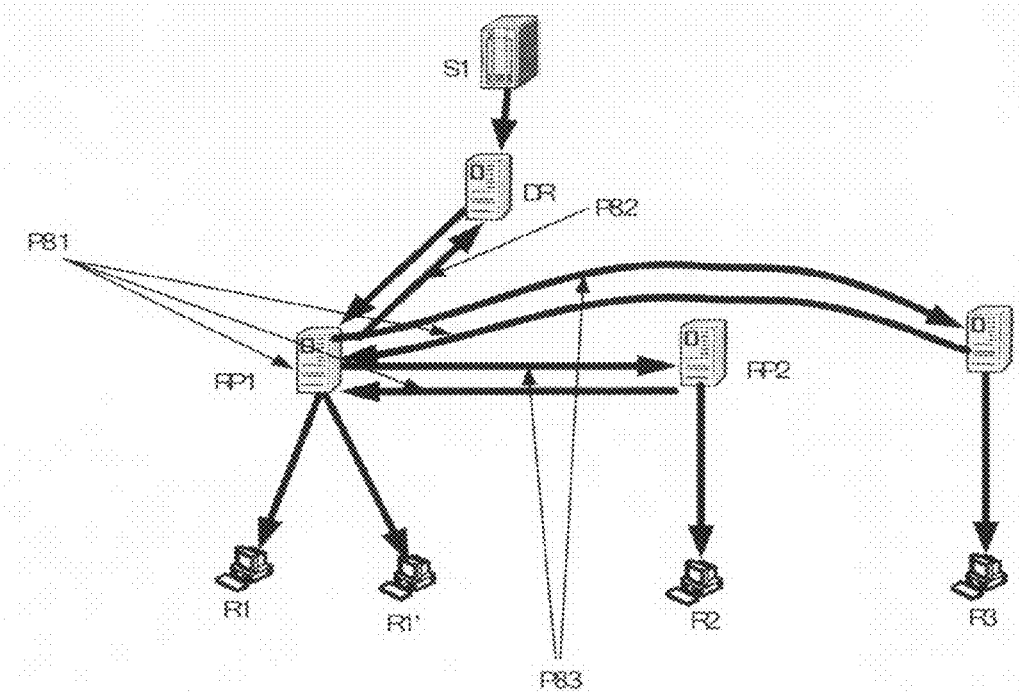
FIG. 8 is a diagram showing a network topology structure using an anycast group of RPs in a multicast communication network according to an embodiment of the present invention.

FIG. 8 is a diagram showing a network topology structure using an anycast group of RPs in a multicast network according to an embodiment of the present invention. In the network topology structure as shown in FIG. 8, there are included a multicast source S1, a designated router DR, three anycast RPs RP1, RP2 and RP3 and subscriber terminals R1, R1', R2 and R3. It is assumed that the RP1 is the main RP.

During the procedure P81, when the RP1 receives the Register Stop message from the RP2 for the first time, the RP 1 starts a timer corresponding to the RP2, and the time value of the timer can be identical to the value of the Register-Stop Timer in the DR. And then, the timer is reset after the Register Stop message from the RP2 is received again. Similarly, an identical timer is set for the RP3. During procedure P82, the RP1 determines whether the timers corresponding to the RP2 and the RP3 are running before sending the Register Stop message to the DR. If both running, which means that the RP2 and the RP3 have sent the Register Stop message to the RP1 respectively, and if now the RP1 does not need the Register message either, then the RP1 can send the Register Stop message to the DR. During procedure P83, the RP1 should determine whether the timers of the RP2 and the RP3 are running before sending the Register messages from the DR to the RP2 and the RP3. If both running, it means that the RP1 does not need to send the Register messages to the RP2 and the RP3 corresponding to the timers. Otherwise, the RP1 should send the Register messages to the RP2 or RP3 as described in the RFC4610.

The specific embodiments of the present invention have been described above. It should be appreciated that the present invention is not limited to the specific embodiments, and those skilled in the art can make various variation or modifications within the scope of the appended claims.

What is claimed is:

1. A method for registering to a designated router in a multicast network, comprising:
    joint-registering, by a main rendezvous point in an anycast group, each rendezvous point associated with the anycast group based on a registering status of the rendezvous points.

2. The method of claim 1 comprising:
    detecting whether a Register message is still needed by a rendezvous point associated with the anycast group;
    sending, by the main rendezvous point, a Register Stop message to the designated router if no rendezvous point associated with the anycast group needs the Register message.

3. The method of claim 2, comprising:
    receiving, by the main rendezvous point, the Register message from the designated router.

4. The method of claim 3 further comprising:
    if any one of other rendezvous points besides the main rendezvous point does not need the Register message, stopping, by the main rendezvous point, forwarding of the Register message to any one of other rendezvous points besides the main rendezvous point.

5. The method of claim 2, wherein the detecting comprises:
    calculating, by the main rendezvous point, a duration from the time when the last Registration Stop message is received from any one of other rendezvous points associated with the anycast group;
    determining, by the main rendezvous point, that the any one of other rendezvous points associated with the anycast group does not need the Register message if the duration is less than a value.

6. The method of claim 2, wherein the detecting comprises:
    detecting whether there is a subscriber terminal desiring to receive a multicast traffic related to the Register message via the main rendezvous point;
    if there is no subscriber terminal desiring to receive the multicast traffic related to the Register message via the main rendezvous point, determining that the main rendezvous point does not need the Register message.

7. The method of claim 6, wherein the determining comprises:
    if there is no subscriber terminal desiring to receive the multicast traffic related to the Register message via the main rendezvous point and a communication path from the designated router to the main rendezvous point is allowed to switch from a unicast communication path currently receiving the Register message to a Shortest Path Tree, determining that the main rendezvous point does not need the Register message.

8. The method of claim 6, wherein the determining comprises:
    if there is at least one subscriber terminal desiring to receive the multicast traffic related to the Register message via the main rendezvous point, detecting whether a Shortest Path Tree from the designated router to the main rendezvous point has been established;
    if the Shortest Path Tree from the designated router to the main rendezvous point has been established, determining that the main rendezvous point does not need the Register message.

9. The method of claim 2, wherein the Register message comprises information for instructing the main rendezvous point to establish a multicast communication Shortest Path Tree with the designated router.

10. A registering apparatus associated with a main rendezvous point in an anycast group in a multicast communication network, the registering apparatus configured to register to a designated router, and implement a joint-registering based on a registering status of each rendezvous point associated with the anycast group.

11. The registering apparatus of claim 10 further configured to:
    detect whether a Register message is still needed by a rendezvous point associated with the anycast group in the multicast communication network;
    send a Register Stop message to the designated router when no rendezvous point associated with the anycast group needs the Register message.

12. The registering apparatus of claim 11 further configured to:
    receive the Register message from the designated router.

13. The registering apparatus of claim 11 further configured to:
    stop forwarding the Register message to any one of other rendezvous points besides the main rendezvous point if any one of other rendezvous points besides the main rendezvous point does not need the Register message.

14. The registering apparatus of claim 11, further configured to:
    calculate a duration from when the last Registration Stop message is received from any one of other rendezvous points associated with the anycast group besides the main rendezvous point;

determine that the any one of other rendezvous points associated with the anycast group does not need the Register message if the duration is less than a value.

15. The registering apparatus of claim 11, further configured to:
   detect whether there is a subscriber terminal desiring to receive a multicast traffic related to the Register message via the main rendezvous point;
   determine that the main rendezvous point does not need the Register message if there is no subscriber terminal desiring to receive the multicast traffic related to the Register message via the main rendezvous point.

16. The registering apparatus of claim 15, further configured to:
   if there is no subscriber terminal desiring to receive the multicast traffic related to the Register message via the main rendezvous point and a communication path from the designated router to the main rendezvous point is allowed to switch from a unicast communication path currently receiving the Register message to a Shortest Path Tree, determining that the main rendezvous point does not need the Register message.

17. The registering apparatus of claim 11, further configured to:
   detect whether a Shortest Path Tree from the designated router to the main rendezvous point has been established if there is at least one subscriber terminal desiring to receive a multicast traffic related to the Register message via the main rendezvous point;
   determine that the main rendezvous point does not need the Register message if the Shortest Path Tree from the designated router to the main rendezvous point has been established.

18. The registering apparatus of claim 11, wherein the Register message comprises information for instructing the main rendezvous point to establish a multicast communication Shortest Path Tree with the designated router.

19. A rendezvous point in an anycast group in a multicast communication network, comprising the registering apparatus according to claim 10.

20. A main rendezvous point in an anycast group, the main rendezvous point having a shortest distance to a designated router relative to each other rendezvous point associated with the anycast group, the main rendezvous point configured to joint-register each rendezvous point associated with the anycast group, to detect whether each rendezvous point associated with the anycast group continues to need the Register message, and to send a Stop Register message to the designated router if no rendezvous point associated with the anycast group needs the Register message.

* * * * *